(12) United States Patent  
Wade

(10) Patent No.: US 9,870,491 B1  
(45) Date of Patent: Jan. 16, 2018

(54) MULTIPLE BATTERY MANAGEMENT

(71) Applicant: Square, Inc., San Francisco, CA (US)

(72) Inventor: Jeremy Wade, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 125 days.

(21) Appl. No.: 14/450,128

(22) Filed: Aug. 1, 2014

(51) Int. Cl.
 *G06K 7/00* (2006.01)
 *G06K 7/08* (2006.01)
 *G06K 7/01* (2006.01)

(52) U.S. Cl.
 CPC ............. *G06K 7/082* (2013.01); *G06K 7/01* (2013.01)

(58) Field of Classification Search
 CPC ... G06K 7/082; G06K 7/01; H02J 9/04; H02J 9/06; H02J 9/061; H02J 2009/068
 USPC .................................... 235/435, 449
 See application file for complete search history.

(56) References Cited

U.S. PATENT DOCUMENTS

| | | | | |
|---|---|---|---|---|
| 5,485,073 | A * | 1/1996 | Kasashima et al. | 320/106 |
| 5,553,294 | A * | 9/1996 | Nanno et al. | 713/340 |
| 5,781,013 | A * | 7/1998 | Takahashi | 324/426 |
| 5,835,366 | A * | 11/1998 | Pleso | H02J 7/0065 307/66 |
| 7,874,483 | B2 * | 1/2011 | Wang et al. | 235/439 |
| 8,181,871 | B2 * | 5/2012 | Wang et al. | 235/439 |
| 8,336,771 | B2 * | 12/2012 | Tsai et al. | 235/380 |
| 8,397,103 | B2 * | 3/2013 | Baba | G06F 11/0745 714/24 |
| 8,584,945 | B2 * | 11/2013 | Wang et al. | 235/439 |
| 8,751,039 | B1 * | 6/2014 | Macoviak et al. | 700/244 |
| 8,807,431 | B2 * | 8/2014 | Wang et al. | 235/439 |
| 9,123,036 | B2 * | 9/2015 | Graylin et al. | |
| 2006/0255128 | A1 * | 11/2006 | Johnson et al. | 235/380 |
| 2007/0285056 | A1 * | 12/2007 | Yoon | G06F 1/263 320/116 |
| 2009/0121021 | A1 * | 5/2009 | Wang et al. | 235/439 |
| 2009/0261166 | A1 * | 10/2009 | Lawson et al. | 235/449 |
| 2010/0108762 | A1 * | 5/2010 | Morley, Jr. | 235/449 |
| 2010/0128449 | A1 * | 5/2010 | Mangaroo | G06F 1/1626 361/752 |

(Continued)

OTHER PUBLICATIONS

Lessons in Electric Circuits [online textbook], Kuphaldt, Tony R., Chapter 11: Batteries and Power Systems [retrieved Jun. 9, 2017]. Retrieved from the Internet: <URL: www.allaboutcircuits.com/textbook/direct-current/chpt-11/practical-considerations-batteries/>.*

(Continued)

*Primary Examiner* — Paultep Savusdiphol
(74) *Attorney, Agent, or Firm* — Polsinelli PC

(57) ABSTRACT

Approaches provide for managing a multiple battery system in an electronic device. In particular, various examples enable a component, or combination or components, such as an electronic switching component to detect a state of a power source to manage switching between at least two power sources. For example, battery protection circuitry can be configured to detect that a voltage of a rechargeable battery has dropped to a threshold voltage, and upon such determination, activate a battery protection state which can result in a non-linear drop off in voltage coming from the rechargeable battery. An electronic switch can detect the non-linear drop off in voltage and can disconnect the rechargeable battery from at least one device component and connect a non-rechargeable battery to the at least one device component to provide backup power to at one component.

20 Claims, 6 Drawing Sheets

(56) References Cited

U.S. PATENT DOCUMENTS

| | | | |
|---|---|---|---|
| 2010/0243732 A1* | 9/2010 | Wallner | 235/380 |
| 2010/0314446 A1* | 12/2010 | Morley, Jr. | 235/449 |
| 2011/0107132 A1* | 5/2011 | Baba | G06F 11/0745 713/324 |
| 2011/0121654 A1* | 5/2011 | Recker et al. | 307/66 |
| 2011/0253788 A1* | 10/2011 | Campbell et al. | 235/441 |
| 2011/0259957 A1* | 10/2011 | Tsai | 235/380 |
| 2011/0307733 A1* | 12/2011 | Tokunaga | 713/340 |
| 2011/0309145 A1* | 12/2011 | Richardson et al. | 235/435 |
| 2012/0005039 A1* | 1/2012 | Dorsey et al. | 705/26.41 |
| 2012/0005096 A1* | 1/2012 | Dorsey et al. | 705/44 |
| 2012/0091200 A1* | 4/2012 | McKelvey et al. | 235/380 |
| 2012/0091201 A1* | 4/2012 | Babu et al. | 235/380 |
| 2012/0095868 A1* | 4/2012 | McKelvey | 705/26.41 |
| 2012/0095869 A1* | 4/2012 | McKelvey | 705/26.41 |
| 2012/0095870 A1* | 4/2012 | McKelvey | 705/26.41 |
| 2012/0095871 A1* | 4/2012 | Dorsey et al. | 705/26.41 |
| 2012/0095906 A1* | 4/2012 | Dorsey et al. | 705/39 |
| 2012/0095907 A1* | 4/2012 | Dorsey et al. | 705/39 |
| 2012/0095915 A1* | 4/2012 | McKelvey | 705/44 |
| 2012/0095916 A1* | 4/2012 | Dorsey et al. | 705/44 |
| 2012/0097739 A1* | 4/2012 | Babu et al. | 235/380 |
| 2012/0097740 A1* | 4/2012 | Lamba et al. | 235/380 |
| 2012/0118956 A1* | 5/2012 | Lamba et al. | 235/437 |
| 2012/0118959 A1* | 5/2012 | Sather et al. | 235/449 |
| 2012/0118960 A1* | 5/2012 | Sather et al. | 235/449 |
| 2012/0126005 A1* | 5/2012 | Dorsey et al. | 235/437 |
| 2012/0126006 A1* | 5/2012 | Dorsey et al. | 235/437 |
| 2012/0126007 A1* | 5/2012 | Lamba et al. | 235/437 |
| 2012/0126010 A1* | 5/2012 | Babu et al. | 235/449 |
| 2012/0126011 A1* | 5/2012 | Lamba et al. | 235/449 |
| 2012/0126012 A1* | 5/2012 | Lamba et al. | 235/449 |
| 2012/0126013 A1* | 5/2012 | Sather et al. | 235/449 |
| 2012/0126014 A1* | 5/2012 | Sather et al. | 235/449 |
| 2012/0130903 A1* | 5/2012 | Dorsey et al. | 705/71 |
| 2012/0132712 A1* | 5/2012 | Babu et al. | 235/449 |
| 2012/0138683 A1* | 6/2012 | Sather et al. | 235/449 |
| 2012/0168505 A1* | 7/2012 | Sather et al. | 235/449 |
| 2012/0234918 A1* | 9/2012 | Lindsay | 235/449 |
| 2012/0270528 A1* | 10/2012 | Goodman | 455/418 |
| 2012/0292384 A1* | 11/2012 | Wang et al. | 235/375 |
| 2013/0024372 A1* | 1/2013 | Spodak et al. | 705/41 |
| 2013/0030997 A1* | 1/2013 | Spodak et al. | 705/41 |
| 2013/0087614 A1* | 4/2013 | Limtao et al. | 235/449 |
| 2013/0140899 A1* | 6/2013 | Tuukkanen et al. | 307/66 |
| 2013/0313903 A1* | 11/2013 | Kayama | 307/26 |
| 2014/0061307 A1* | 3/2014 | Wang et al. | 235/439 |
| 2014/0120866 A1* | 5/2014 | Furtney | H04W 52/0296 455/406 |
| 2014/0167503 A1* | 6/2014 | Redpath et al. | 307/23 |
| 2014/0297539 A1* | 10/2014 | Swamy et al. | 705/71 |

OTHER PUBLICATIONS

Scherz, Paul. Practical Electronics for Inventors (McGraw-Hill, 2000), 5 cover pages, pp. v, 9, & 10.*

* cited by examiner

MULTIPLE BATTERY MANAGEMENT

BACKGROUND

Consumers can interact with merchants to conduct various financial payment transactions. For example, with the proliferation of mobile computing devices (e.g., smart phones and tablet computers, etc.), development of various attachable hardware devices has increased to provide expanded functionality to such devices. One such example is an attachable magnetic card reader device, used for reading credit or debit card information to facilitate the receipt and processing of payments. Some of these reader devices can be physically and communicatively coupled to an associated mobile device using a standard 3.5 mm audio plug when inserted into the headphone port of the mobile device. Given the nature of these devices, it can be desirable to ensure that certain components, such as security subsystems and the like, are continually powered and active. However, the physical size and nature of these card reader devices may not allow for replacing, adjusting, or otherwise making modifications to the device's system components to ensure adequate backup power. As such, it is desirable to develop approaches to ensure continual power to certain device components.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
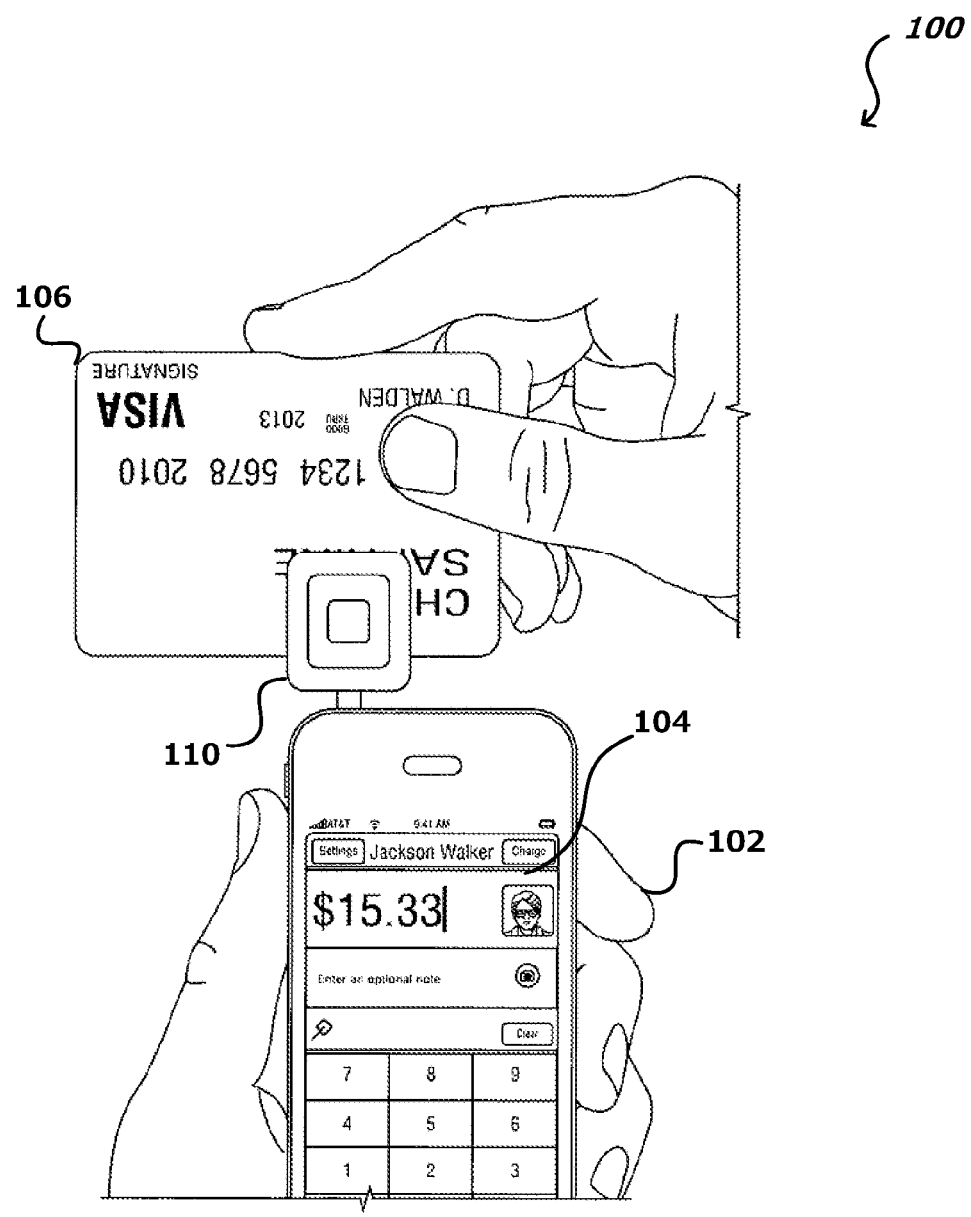
FIG. 1 illustrates an example situation of a customer interacting with a merchant to conduct a financial payment transaction in accordance with various embodiments.

Systems and methods in accordance with various embodiments of the present disclosure overcome one or more of the above-referenced and other deficiencies in conventional approaches to managing a multiple battery system in an electronic device. In particular, various embodiments enable a component, or combination or components, such as an electronic switching component to detect a state of a power source to manage switching between at least two power sources.

For example, in accordance with various embodiments, a card reader device or other electronic device can be provided, where the device can include, for example, a read head including a slot for swiping of a magnetic stripe of a buyer's financial transaction card. In various embodiments, the card reader head can include a dip slot for accepting integrated circuit cards, such as those conforming to the Europay, Mastercard, and Visa (EMV) standard. The read head is configured to read data on the magnetic stripe and/or integrated circuit and produce a signal indicative of the data stored on the magnetic stripe. The card reader device can include one or more power sources and various other components. The power sources can include, for example, a rechargeable battery and a non-rechargeable battery among other power sources. In this example, the rechargeable battery can be coupled to at least backup circuitry such as tamper protection circuitry and battery protection circuitry. The rechargeable battery can be configured to provide power to various device components, as may include at least one of the read head and the backup circuitry.

In accordance with some embodiments, the battery protection circuitry can be configured to determine that the voltage of the rechargeable battery has dropped to a threshold voltage, and upon such determination, activate a battery protection state which can result in a non-linear drop off in power coming from the rechargeable battery. In this situation, a non-rechargeable battery can be configured to provide backup power to at least the tamper protection circuitry and/or various other components. For example, an electronic switch can be configured to operate in a first state to electrically isolate the non-rechargeable battery from one or more card reader device components (e.g., the rechargeable battery, system loads, etc.) when the rechargeable battery operates as a stable power supply having a substantially linear decline in voltage, wherein the rechargeable battery provides power to at least the read head and the tamper protection circuitry, and can operate in a second state to electrically isolate the rechargeable battery from one or more device components (e.g., the read head, the tamper protection circuitry, etc.) and electrically couple the non-rechargeable battery to at least the tamper protection circuitry when there is the non-linear drop off in voltage coming from the rechargeable battery.

Other advantages, variations, and functions are described and suggested below as may be provided in accordance with the various embodiments.

FIG. 1 illustrates an example situation 100 of a user 102 interacting with card reader device 110 of a merchant or other entity to conduct a financial payment transaction ("transaction"). In this example, the user 102 is shown conducting a transaction with the merchant or other entity at a point-of-sale register using a payment card, e.g., a credit card. It should be noted that although the user is shown conducting a transaction using a payment card, in various embodiments, transactions can be conducted through a card-less payment account that is linked to the payment card. Other transactions include person-to-person, account-to-account, electronic cash, among others. These payment instruments are usually associated with an established consumer account. It should be further noted that although a credit card is shown to conduct transactions, approaches described herein apply to other types of financial payment instruments including, for example, debit cards, and card-less payment accounts.

As described, in conventional card reader devices, it can be desirable to ensure that certain components, for example, backup subsystems such as tamper protection circuitry are continually powered and active. One such approach is to use dual power sourcing using, for example, rechargeable and non-rechargeable batteries. In such an approach, it is desirable to use power from the rechargeable battery instead of the non-rechargeable battery to conserve the power of the non-rechargeable battery. Conventional approaches use two diodes to isolate the power sources, one diode for each power source. The diode corresponding to the power source that is stronger will generally be the diode to conduct, and it will be that power source that sources power. However, due to manufacturing and other constraints, diodes do not have a fixed point where they start and stop conducting; rather, the point at which a diode starts and stops conducting is a gradual process. Because of this and other factors, as one battery (e.g., the rechargeable battery) discharges and nears the power level of another battery (e.g., the non-rechargeable battery), such an arrangement of batteries and diodes would allow for power coming from both batteries concurrently. Accordingly, although the sum total of current is the current needed to power the device, the issue is that such an approach would pull a non-zero amount of power from the non-rechargeable battery before the rechargeable battery will finish depleting to at least a predetermined power level. Further, due to the physical size and nature of these card reader devices, replacing, adjusting, or otherwise making modifications to the device's system components such as the device's batteries may not be possible.

Accordingly, in accordance with various embodiments, approaches provide for managing a multiple battery system by at least enabling a component, or combination or components, such as an electronic switching component to detect a state of a power source (e.g., a rechargeable battery), and based at least in part on the state of the rechargeable battery, switch between the rechargeable battery and a non-rechargeable battery to power at least a portion of the device, such as critical, backup, or other device components.

Figure 2A:
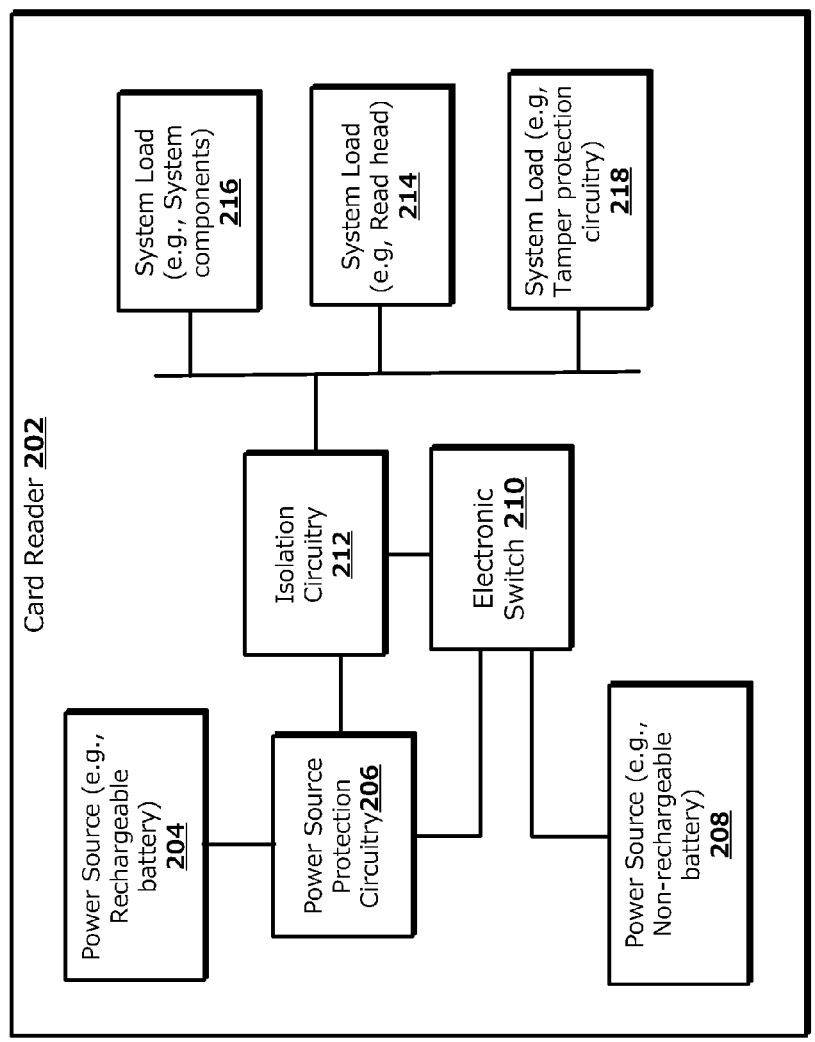
FIG. 2A illustrates an example block diagram of a multi-battery management system in accordance with an embodiment.

FIG. 2A illustrates an example block diagram 200 of a multiple battery management system in accordance with an embodiment. As shown in FIG. 2A, a card reader device 202 includes, for example, a first power source 204 (e.g., a rechargeable battery), a power source protection circuitry 206, a second power source 208 (e.g., a non-rechargeable battery), an electronic switch 210, isolation circuitry 212, and one or more system loads (214, 216, and 218) (e.g., read head, tamper protection circuitry, system components, backup circuitry, etc.). In accordance with various embodiments, the card reader device can be used to facilitate a financial transaction between entities. For example, the card reader device can be coupled to a computing device (e.g., a mobile phone, tablet computer, etc.) where the computing device can run a merchant application or other financial transaction software that can provide functionality to facilitate a point-of-sale such as by enabling payment transactions. The merchant application can be downloaded and installed on the computing device and the application can be configured to operate with a card reader, where an individual can complete a financial transaction by swiping a magnetic stripe card through the card reader connected to the computing device. In this example, the financial transaction can be any transaction that involves receiving or sending payment from one person to another. The magnetic stripe card can be, for example, a credit card, a debit card, or other types of payment authenticating pieces capable of carrying out the financial transaction. In accordance with various embodiments, the size of the card reader is miniaturized to be portable for connection with the computing device. The card reader is configured to reliably read data encoded in a magnetic strip of the card with minimum error in a single swipe and provide a signal that corresponds to the data read to the computing device, which then decodes the incoming signal from the card reader and acts as a point-of-sale device to complete the financial transaction.

Returning to FIG. 2A, as shown, the rechargeable battery 204 can be coupled to the electronic switch 210 via the power source protection circuitry 206 and can be coupled to isolation circuitry 212. In accordance with various embodiments, the rechargeable battery 204 can correspond to at least one of, for example, a lead-acid battery, a nickel cadmium battery (NiCd), a nickel metal hydride (NiMH) battery, a lithium ion (Li-ion) battery, or a lithium ion polymer (Li-ion polymer) battery.

The power source protection circuitry (e.g., charge controller, charge regulator, battery regulator or protection circuitry, etc.) 206 can be configured to limit the rate at which electric current is added to or drawn from the rechargeable battery. Further, in accordance with various embodiments, the protection circuitry 206 can prevent overcharging and may protect against overvoltage, which can reduce battery performance or lifespan, and may pose a safety risk. It may also prevent completely draining ("deep discharging") the rechargeable battery, or perform controlled discharges, depending on the battery technology, to protect battery life. In accordance with various embodiments, the protection circuitry can include one or more electrical components or can be encapsulated in a single microchip, an integrated circuit (IC) such as a charge controller IC or charge control IC. In accordance with various embodiments, the protection circuitry can include, for example, an adjustable resistor, a switching component configured to disconnect the rechargeable battery from at least one system load, and control circuitry configured to determine a voltage of the rechargeable battery and operate the switching component of the protection circuitry. The adjustable resistor can be used to adjust a threshold voltage, where when the voltage of the rechargeable battery at least reaches the threshold voltage, the control circuitry or other similar circuitry can cause the switching component of the protection circuitry to disconnect or otherwise decouple the rechargeable battery from the system. It should be noted that although the protection circuitry is shown separate the rechargeable battery, in accordance with various embodiments, the protection circuitry 206 can be integrated within the rechargeable battery.

The non-rechargeable battery 208 is coupled to the electronic switch 210. Example non-rechargeable batteries include, for example, alkaline batteries, aluminum-ion batteries, dry cell batteries, lithium batteries, among others. The electronic switch can correspond to at least one of a regulator, a bipolar junction transistor, a field effect transistor, among other electrical or mechanical switching components. The electronic switch is coupled to isolation circuitry 212, and can be configured to operate in a first state to electrically isolate the non-rechargeable battery from one or more card reader device components (e.g., the rechargeable battery, system loads, etc.), wherein the rechargeable battery provides power to at least the read head and the tamper protection circuitry, and can operate in a second state to electrically isolate the rechargeable battery from one or more device components (e.g., the read head, the tamper protection circuitry, etc.) and connect the non-rechargeable battery to at least the tamper protection circuitry.

The systems loads can include, for example, the read head, tamper protection circuitry, backup system components, or various other system components. The backup system can include, for example, the tamper protection circuitry, real-time clock, memory and other components. The tamper protection circuitry can be configured to detect tampering of at least one of physical or electrical components of the card reader. Physical tampering can include, for example, detecting whether the card reader device has been opened or whether a component (e.g., physical or electrical component) has been modified. Electrical tampering can include at least one of modify the path of electrical current, modifying code, etc. In accordance with various embodiments, when the card reader device is active, power is drawn from the rechargeable battery 204 and used to power at least system loads 214, 216, and 218 through the isolation circuitry. Accordingly, when the rechargeable battery provides power to the system loads, the non-rechargeable battery 208 is not used to power the device but remains available to provide backup power to at least to a backup system (i.e., tamper protection circuitry, real-time clock, memory, etc.) of the device. For example, when the device is powered off, the non-rechargeable battery can provide power to the backup system, various other critical device components, and/or device components when needed, such as when the rechargeable battery is depleted to at least a threshold voltage. In accordance with various embodiments, advantageously, approaches in multiple battery management allow for the backup system to receive continual power. Further, approaches ensure that the rechargeable battery is depleted to at least a threshold amount before using the non-rechargeable battery. In this way, power is conserved in the rechargeable battery.

Figure 2B:
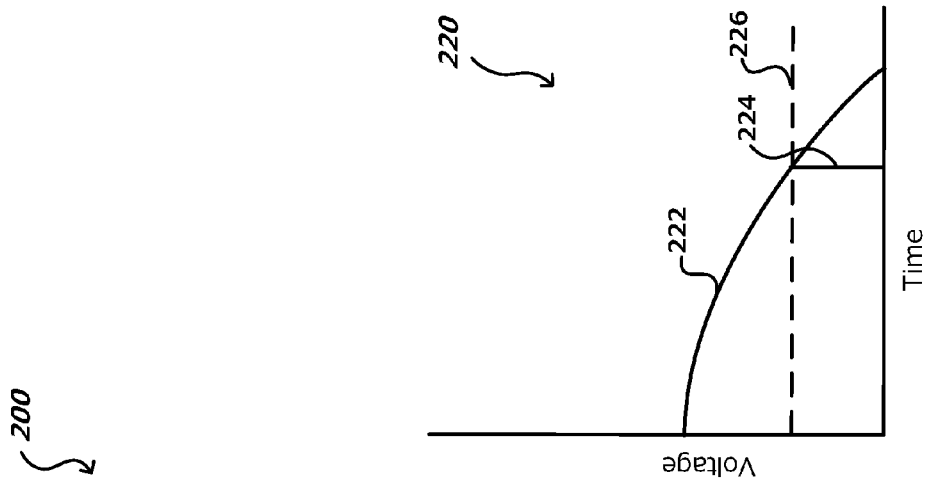
FIG. 2B illustrates an example discharge curve of a battery that can be used in accordance with various embodiments.

In accordance with various embodiments, situation 220 of FIG. 2B illustrates an example discharge curve of a rechargeable battery over time. As shown, the units of the y-axis correspond to an amount of voltage of the rechargeable battery and the units of the x-axis correspond to a time of use of the rechargeable battery. As the rechargeable battery discharges, the battery undergoes a substantially linear drop in voltage as illustrated by line 222. A substantially linear drop off can refer to, for example, a normal battery discharge state where the voltage gradually declines to zero or substantially zero volts. In accordance with various embodiments, the power source protection circuitry 206 can be configured to detect that the voltage of the rechargeable battery 204 has dropped to a threshold voltage. In this example, the threshold voltage is indicated by line 226. The threshold voltage can be any predetermined voltage. An example threshold voltage includes, for example, approximately one volt. It should be noted that other voltages are possible in accordance with the various embodiments described herein, and in many situations, the threshold voltage can be adjusted from one voltage to another voltage.

Upon determining that the voltage of the rechargeable battery has dropped to a threshold voltage, the device can activate a battery protection state which can result in a non-linear drop off (see line 224 of FIG. 2B) in voltage coming from the rechargeable battery 204. A non-linear drop off in voltage can refer to, for example, a sudden drop in voltage, often to zero volts or substantially zero volts. A "sudden" drop can refer to a drop in voltage that occurs over a short period of time, such as approximately 5 milliseconds or near instant. In accordance with various embodiments, in this situation, a non-rechargeable battery 208 can be used to provide backup power to at least the tamper protection circuitry 218 and/or various other components of the card reader device. For example, the electronic switch 210 can be configured to operate in a first state to electrically isolate the non-rechargeable battery from one or more card reader device components (e.g., read head 214 and the tamper protection circuitry 218) when the voltage of the rechargeable battery is above the threshold voltage, and can operate in a second state to electrically isolate the rechargeable battery from one or more device components (e.g., the read head and the tamper protection circuitry) and electrically couple the non-rechargeable battery 208 to at least the tamper protection circuitry or other backup components 218 when the voltage of the rechargeable battery is below the threshold voltage.

Figure 3:
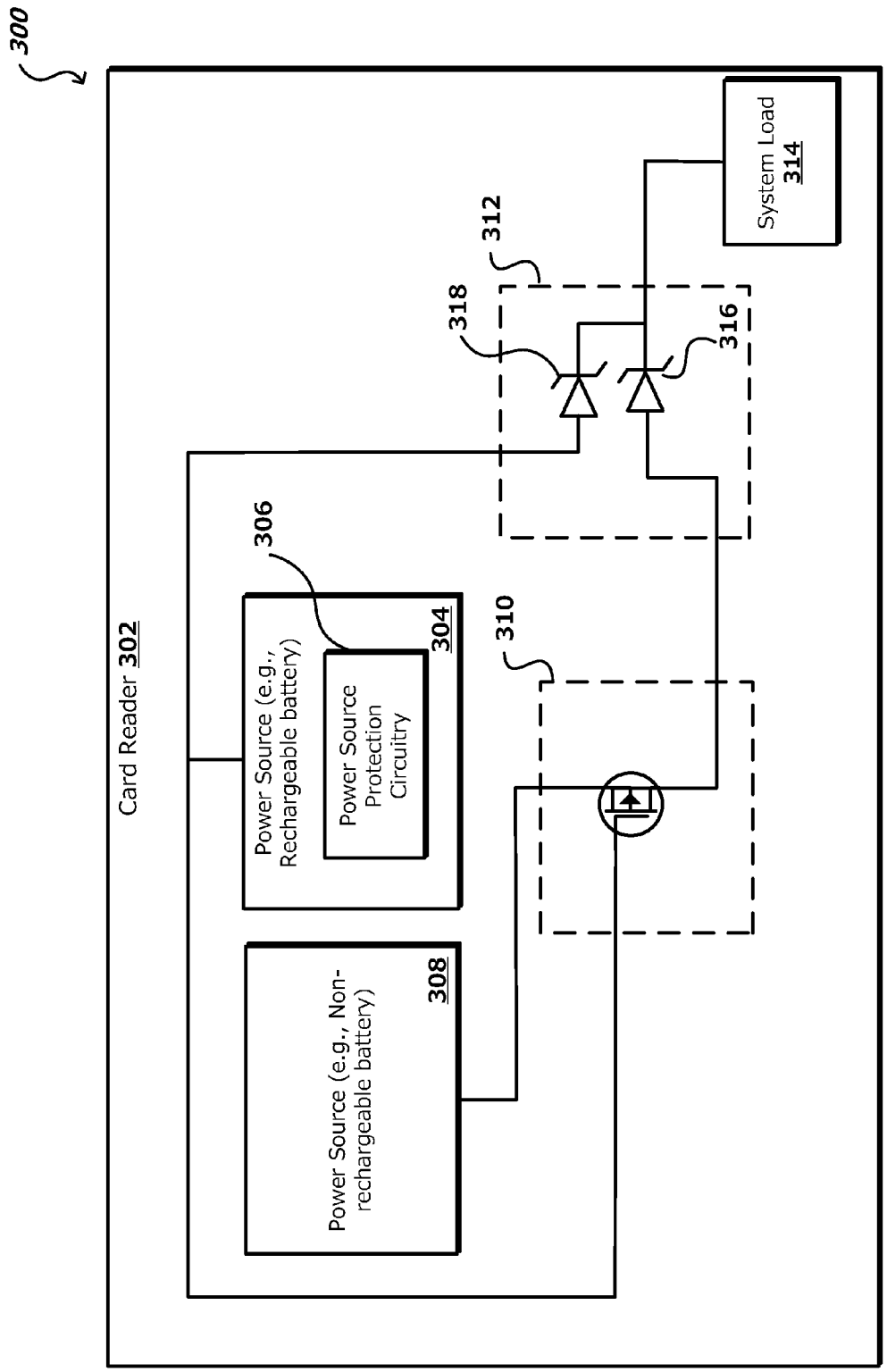
FIG. 3 illustrates an example block diagram of a multi-battery management system in accordance with alternate embodiments.

FIG. 3 illustrates a detailed view 300 of a card reader device 302 in accordance with various embodiments. As shown in FIG. 3, a card reader device 302 can include, for example, a first power source 304 (e.g., a rechargeable battery), power source protection circuitry 306, a second power source 308 (e.g., a non-rechargeable battery), an electronic switch 310, isolation circuitry 314, and one or more system loads 314 (e.g., read head, tamper protection circuitry, system components, etc.). In this example, the power source protection circuitry is included in the rechargeable battery, however as described herein and known to those skilled in the art, such circuitry and/or functionality of such circuitry can be positioned or other implemented outside of the rechargeable battery 304. As described, the power source protection circuitry can be configured to detect that the voltage of the rechargeable battery has dropped to a threshold voltage and activate a battery protection state which results in a non-linear drop off in power coming from the rechargeable battery.

For example, in accordance with various embodiments, as the rechargeable battery provides power to the card reader device, the power level of the battery will decrease. The power level of the rechargeable battery can be detected by the power source protection circuitry and the power source protection circuitry can disconnect or otherwise electrically isolate the rechargeable battery from device components, causing a non-linear drop in voltage, from providing power to components of the card reader device. In this way, the voltage that is detected by the electronic switch 310 by the rechargeable battery is substantially zero volts. Accordingly, in accordance with various embodiments, the non-linear drop off in voltage caused by the power source protection circuitry can be used to control the electronic switch 310. For example, the non-linear drop off in voltage can be used to control the enable line of a regulator or a gate of a switch (e.g., a high-side FET) to cause the electronic switch to use the non-rechargeable battery to power components of the card reader device.

As shown, the non-rechargeable battery 308 is coupled to the electronic switch 310. The electronic switch, in this example, is a high-side FET, but in various other embodiments the electronic switch can be one of a number of different switches as known to those in the art. When the rechargeable battery is active or is otherwise providing power to device loads through diode 318, the high-side FET is configured to electrically isolate the non-rechargeable battery from device loads. When the power protection circuitry 306 detects that the voltage of the rechargeable battery 304 has reached a threshold voltage, the power protection circuitry can activate a battery protection state which results in a non-linear drop off in power coming from the battery protection circuitry. The high-side FET, in this example, receives substantial zero volts which activates or otherwise turns on the high-side FET. In accordance with various embodiments, turning on the high-side FET electrically isolates the rechargeable battery from device loads and electrically couples the non-rechargeable battery to at least system load 314 through diode 316.

In accordance with various embodiments, the electronic switch 310 can be one of a number electrical switching components, as may include various regulators. For example, in the situation where a regulator is used, an enable pin of the regulator can be connected to the output of the rechargeable battery. When the rechargeable battery is active, the regulator is off, the non-rechargeable battery is not providing power system load 314, and the rechargeable battery is providing power to system load 314 via diode 318. When the power protection circuitry 306 detects that the voltage of the rechargeable battery 304 has reached a threshold voltage, the power protection circuitry the power protection circuitry can activate a battery protection state which results in a non-linear drop off in power coming from the battery protection circuitry. The regulator, in this example, receives substantial zero volts at its enable pin which activates or otherwise turns on the regulator. In accordance with various embodiments, turning on the regulator electrically isolates the rechargeable battery from device loads and electrically couples the non-rechargeable battery 308 to at least system load 314 via diode 316.

In accordance with various embodiments, as described, isolation circuitry 312, can be used to connect one of the rechargeable battery or the non-rechargeable battery system load 314. The isolation circuitry can include, for example, at least two isolation diodes. In accordance with various embodiments, the diodes can correspond to at least one of light emitting diodes, photodiodes, schottky diodes, transient voltage suppression diodes, tunnel diodes, varicap diodes, or zener diodes. In accordance with various embodiments, systems load 314 can include, for example, the read head, tamper protection circuitry, backup system components, or a combination thereof, where the backup system can include, for example, the tamper protection circuitry, real-time clock, memory and other components.

In accordance with various embodiments, when the card reader device is active, power is drawn from the rechargeable battery 304 to power at least system load 314. In this example, the non-rechargeable battery 308 is not used to power system loads but remains available to provide backup power to at least to a backup system (i.e., tamper protection circuitry, real-time clock, memory, etc.) of the device. For example, when the device is powered off, the non-rechargeable battery can provide power to the backup system, various other critical device components, and/or device components when needed, such as when the rechargeable battery is depleted to at least a threshold voltage. In accordance with various embodiments, advantageously, approaches in multiple battery management allow for the backup system to receive continual power. Further, approaches ensure that the rechargeable battery is depleted to at least a threshold amount before using the non-rechargeable battery. In this way, power is conserved in the non-rechargeable battery.

Figure 4:
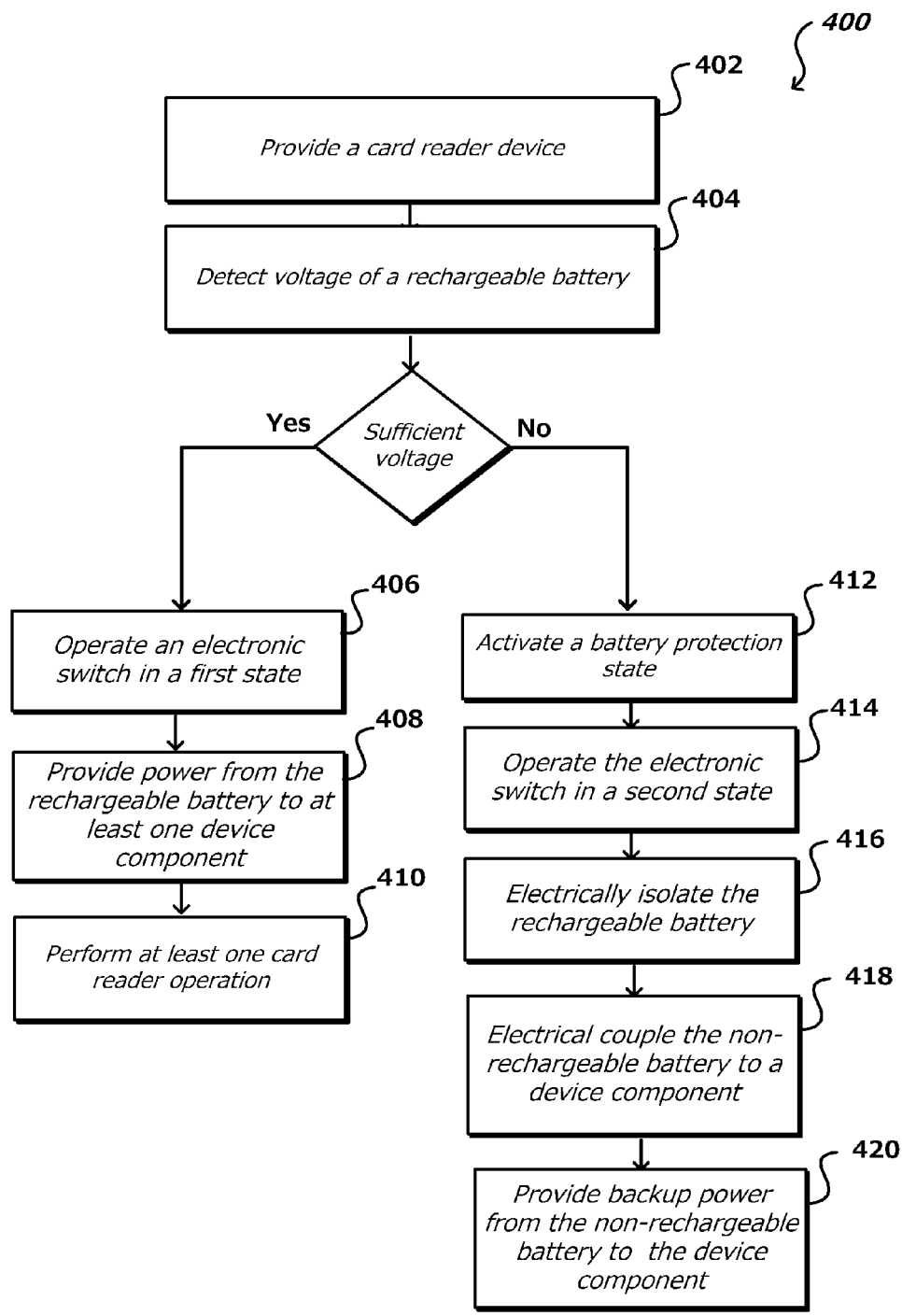
FIG. 4 illustrates an example process for managing a multiple battery system in accordance with various embodiments.

FIG. 4 illustrates an example process 400 for managing a multi-battery system in accordance with various embodiments. A portable computing device (e.g., a mobile phone, a tablet computer, etc.) configured to run a merchant application or other software can be provided. For example, in accordance with various embodiments, a card reader device or other electronic device can be provided 402, where the card reader device can include, for example, a read head including a slot for swiping of a magnetic stripe of a buyer's financial transaction card with the slot in response to a financial transaction between a buyer and seller, the read head configured to read data on the magnetic stripe and producing a signal indicative of data stored on the magnetic stripe. In various embodiments, the card reader head can include a dip slot for accepting integrated circuit cards, such as those conforming to the Europay, Mastercard, and Visa (EMV) standard. The card reader device can include one or more power sources and various other components. The power sources can include, for example, a rechargeable battery and a non-rechargeable battery. In this example, the rechargeable battery can be coupled at least to tamper protection circuitry and a battery protection circuitry. The rechargeable battery can be configured to provide power to various device components, as may include at least one of the read head and the tamper protection circuitry. Other components can include, for example, a pair of isolation diodes, a first diode of the pair of isolation diodes being coupled between the rechargeable battery and at least one of the read head or the tamper protection circuitry, a second diode of the pair of isolation diodes being coupled between the electronic switch and one of the read head or the tamper protection circuitry.

In accordance with an embodiment, the battery protection circuitry can be configured to detect 404 the voltage of the rechargeable battery. In accordance with an embodiment, the battery protection circuitry can detect that the voltage of the rechargeable battery is above a threshold voltage. In the situation where the voltage of the rechargeable battery is above the threshold voltage, an electronic switch can be configured to operate 406 in a first state to electrically isolate the non-rechargeable battery from one or more card reader device components (e.g., the rechargeable battery, system loads, etc.), wherein the rechargeable battery provides 408 power to at least the read head and the tamper protection circuitry. Thereafter, the device can perform 410 at least one operation corresponding to a financial transaction facilitated by the card reader. In the situation where the voltage of the rechargeable battery has dropped to a threshold voltage, the device can activate 412 a battery protection state which can result in a non-linear drop off in power coming from the rechargeable battery. In this situation, the electronic switch can operate 414 in a second state to to electrically isolate 416 the rechargeable battery from one or more device components (e.g., the read head, the tamper protection circuitry, etc.) and electrically couple 418 the non-rechargeable battery to at least the tamper protection circuitry when there is the non-linear drop off in voltage coming from the rechargeable battery. Thereafter, the non-rechargeable battery can be configured to provide 420 backup power to at least the tamper protection circuitry and/or various other components.

Figure 5A:
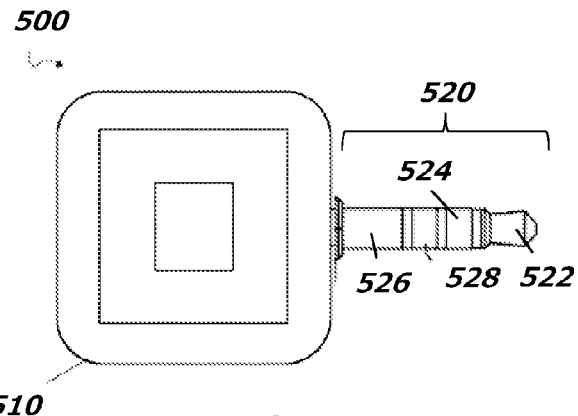
FIGS. 5A and 5B illustrate front and side views of an example card reader device that can be used in accordance with various embodiments.
Figure 5B:
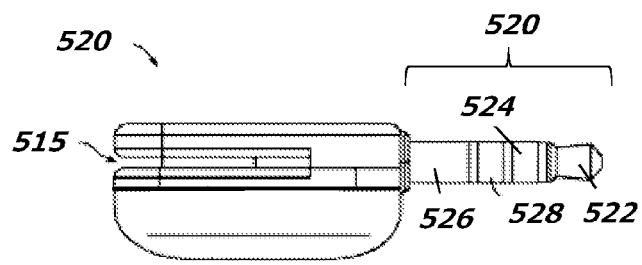

FIGS. 5A and 5B illustrate front and side views 500 and 520 respectively of an example card reader device that can be used in accordance with various embodiments. As shown, card reader device includes housing 510 that is coupled to an audio plug 520 (e.g., a 3.5 mm audio plug). Housing 510 contains the hardware components and circuitry of the card reader device. Additionally, the housing 510 includes a slot 515 through which a payment card, such as a credit or debit card, may be swiped. Passage of a magnetic stripe of the payment card past a read head can enable payment information to be received via the read head. The resulting signal provided by the read head is typically an analog signal that must be digitized e.g., using ADC, before the resulting digital information is provided to microcontroller.

Different types of information can be read from a magnetic stripe, depending on implementation. For example, user and payment card account information can be read from track 1 and track 2 of the magnetic stripe, respectively. However, in other implementations, any track (or combination of tracks) may be read from the magnetic stripe, including any combination, or all of tracks 1, 2 and 3.

As illustrated, the housing 510 is physically and communicatively coupled to audio plug 520, which can be removably inserted into a headphone port of a host device, such as a smart phone, personal computer, tablet device, or the like. The audio plug 520 can form part of an audio bus that includes left and right audio output channels (via left/right contacts 522, 524), an audio input channel (via microphone contact 526), and a ground connection (via ground contact 528). Once audio plug 520 is inserted into the compatible jack of a host device, such as a smartphone, bi-directional communication between the card reader device and the host is enabled e.g., via the left/right audio output channels and audio input channel, using the methods and systems discussed above.

Although the reader illustrated in FIGS. 5A and 5B can accept payment cards containing a magnetic stripe (e.g., using a read head), it is understood that the reader can be configured to receive other types of payment cards, and accordingly can contain additional or different hardware and/or software modules than those described above. For example, housing 510 can include a dip slot for accepting integrated circuit cards, such as those conforming to the Europay, Mastercard, and Visa (EMV) standard. Once successful bidirectional communication has been established between the reader and its host, the reader can be used to facilitate a payment transaction, for example between a merchant and a buyer using a magnetic payment card.

Figure 6:
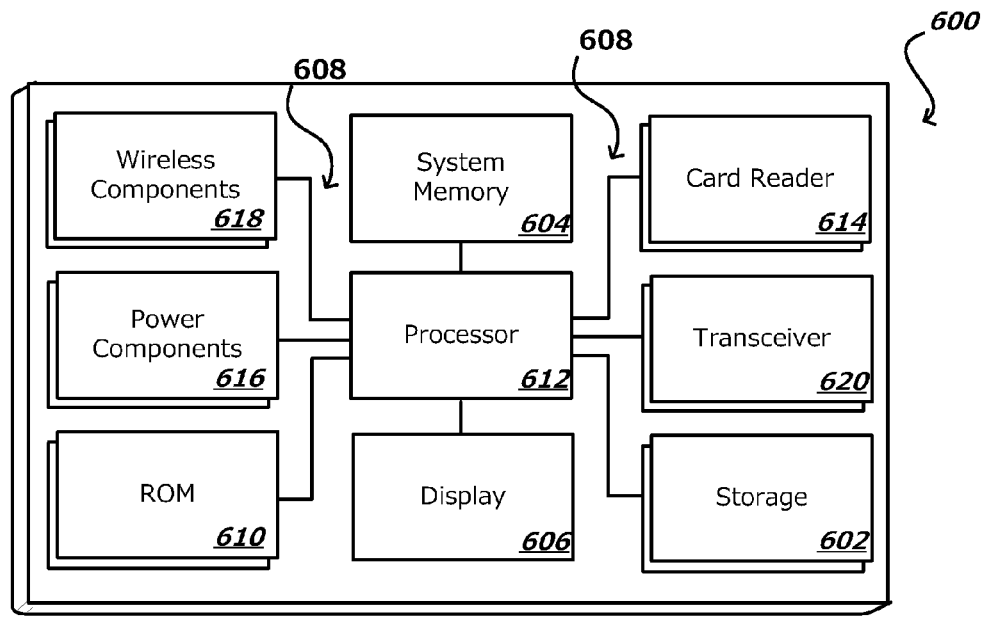
FIG. 6 illustrates an example set of basic components of a card reader device such as the device described with respect to FIGS. 5A and 5B.

FIG. 6 illustrates an example set of basic components of a card reader device such as the device described with respect to FIGS. 5A and 5B. In this example, the device includes storage 602, system memory 604, display interface 606, system bus 608, ROM 610, at least one processor 612, card reader circuitry 614, power components 616, wireless components 618, and transceiver 620. In some aspects, the system bus 608 collectively represents all system, peripheral, and chipset buses that communicatively connect the numerous internal devices of mobile card reader. For instance, system bus communicatively connects the processor(s) 612 with the various components.

The example device includes at least one processing unit 612 that can execute instructions that can be stored in a memory component or element 604. For example, in some implementations, the processor(s) 612 retrieve instructions to execute (and data to process) in order to execute the steps of the subject technology. The processor(s) 612 can include a microcontroller, or a single processor or a multi-core processor in different implementations. Additionally, the processor(s) can comprise one or more graphics processing units (GPUs) and/or one or more decoders (e.g., analog/digital converters), for example, to drive a display that may be coupled to a display interface. As would be apparent to one of ordinary skill in the art, the device can include many types of memory, data storage, or computer-readable media, such as a first data storage for program instructions for execution by the processing unit(s) 612, the same or separate storage can be used for data, a removable memory can be available for sharing information with other devices, and any number of communication approaches can be available for sharing with other devices.

System memory 604 can store static data and instructions needed by the processor(s) 612 and other modules of mobile card reader. Similarly, the processor(s) 614 can comprise one or more memory locations such as a CPU cache or processor in memory (PIM), etc. System memory 604 can include a read-and-write memory device. In some aspects, this device can be a non-volatile memory that stores instructions and data even when mobile card reader is without power. Some implementations of the subject disclosure can use a mass-storage device (such as solid state or magnetic devices) e.g., permanent storage device 602. Although the system memory can be either volatile or non-volatile, in some examples the system memory is a volatile read-and-write memory, such as a random access memory 610. System memory 604 can store some of the instructions and data that the processor needs at runtime, for example, to facilitate the process of mobile card reader activation, or payment processing, as discussed above. In some implementations, the processes of the subject disclosure are stored in system memory 604, storage device 602 and/or one or more memory locations embedded with the processor(s) 612. From these various memory units, processor(s) 612 retrieve instructions to execute and data to process in order to execute the processes of some implementations of the instant disclosure.

The bus 608 also connects to card reader circuitry 614 and a display interface. The input card reader circuitry 614 enables a user (e.g., a buyer or a merchant) to provide payment card information, for example via a payment card, to mobile card reader. Input devices used with card reader can include for example, alphanumeric keypads, such as input device; however, other input devices may also be used, including pointing devices (also called "cursor control devices") and/or wireless devices such as wireless keyboards, wireless pointing devices, etc. In this way, the device can include at least one additional input component able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Bus 608 also communicatively couples the processor to one or more wireless components operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

Bus 608 also communicatively couples mobile card reader to a network (not shown) through transceiver 620. It should be understood that the transceiver 620 can be configured to send/receive radio frequency transmissions using a variety of messaging services. As discussed above, transceiver 620 can be configured to transact data using one or more of a MMS service, SMS service, or an email service.

In this manner, mobile card reader can communicate with one or more computers or servers, such as that of a payment processing service or activation service for the mobile card reader. In practice the methods of the subject technology can be carried out by mobile card reader. In some aspects, instructions for performing one or more of the method steps of the present disclosure are stored on one or more memory devices such as the storage 602 and/or the system memory 604.

Bus 608 also communicatively couples the processor to a power system, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
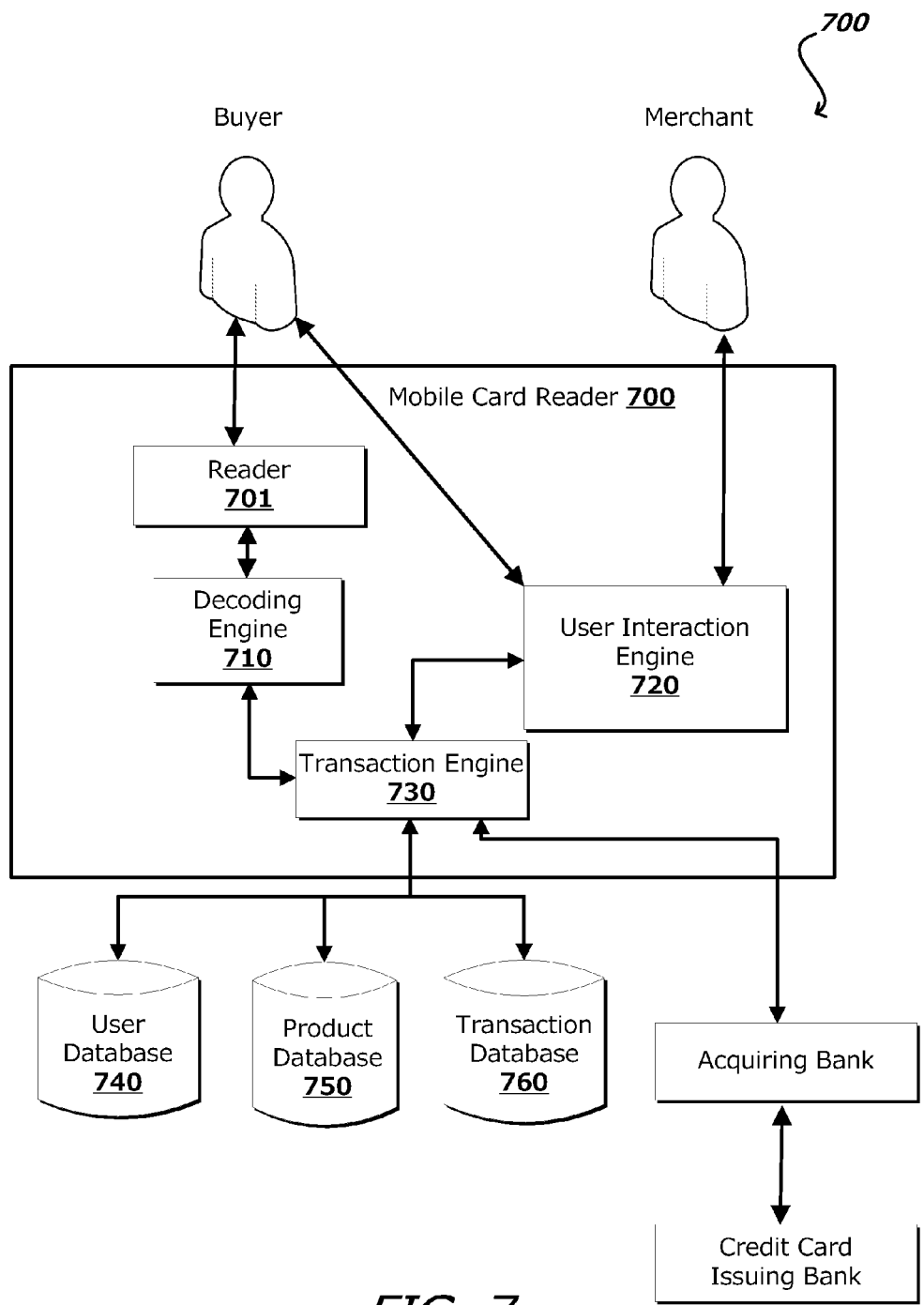
FIG. 7 illustrates an example environment for conducting a financial payment transaction in accordance with various embodiments.

FIG. 7 illustrates an example of an environment 700 in which a reader of the subject technology is used to facilitate a financial transaction between a buyer and a merchant. Although the diagrams depict components as functionally separate, such depictions are merely for illustrative purposes. It will be apparent that the components portrayed in this figure can be arbitrarily combined or divided into separate software, firmware and/or hardware components, such as combined into a common device or mobile card reader (e.g., mobile card reader 100 discussed above). Furthermore, it will also be apparent that such components, regardless of how they are combined or divided, can execute on the same host or multiple hosts, and wherein multiple hosts can be connected by one or more networks.

In the example environment, the system includes a mobile card reader 700, including reader 701, decoding engine 710, a user interaction engine 720, and a transaction engine 730. Additionally, the mobile card reader may also include (or have access to) one or more of a user database 740, a product or service database 750, and a transaction database 760, which are all coupled to transaction engine 730.

As used herein, the term engine refers to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical. As used herein, the term database is used broadly to include any known or convenient means for storing data, whether centralized or distributed, relational or otherwise.

The mobile card reader 700 can include various software and hardware modules including software, firmware, hardware, or any combination capable of at least receiving the signal, decoding if needed, exchanging information with a transaction server, for example to validate merchant information (form mobile card reader activation) or to verify the buyer and/or seller's account information, conducting the transaction, and generating a receipt. Typical components of mobile card reader 700 can include but are not limited to a battery, LCD driver, a display, a radio frequency (RF) antenna (e.g., a cellular antenna), a speaker, a Bluetooth circuit, and Wi-Fi circuitry.

In response to a financial transaction between a buyer and a seller, mobile card reader 700 accepts information selected including but not limited to information from a financial transaction or information pertaining to financial transaction card used by the buyer in the transaction. Additionally, a financial transaction device can be utilized. Non-limiting examples of financial transaction devices include but are not limited to a wristband, RFID chip, cell phone, biometric marker and the like. At least a portion of this information is communicated to a third party financial institution or payment network to authorize the transaction.

Payment confirmation can be made with a communication channel of the buyer's choice. As non-limiting examples, confirmation of payment can be an electronic notification in the form selected from at least one of, email, SMS message, MMS message, email message, tweet (message delivered via Twitter), instant message, communication within a social network and the like. In response to the transaction, a confirmation (e.g., an authorization response) is made that the buyer is authorized to use the financial transaction card. In certain implementations, a confirmation can be provided that indicates a sufficiency of funds available to the buyer.

Reader 701 is configured to read data encoded in a magnetic strip of a card being swiped by a buyer and send a signal that corresponds to the data read to mobile card reader 700. However, as discussed above, reader 701 can be configured to receive various payment card types, including but not limited to IC cards that can be provided to reader 701 using a dip slot.

The size of mobile card reader 700 can be miniaturized for portability. In addition, the mobile card reader 701 is also designed to reliably read the card with minimum error via a single swipe by counteracting vendor specific filtering. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A card reader, comprising:
a read head within a slot of the card reader, the slot to receive a magnetic stripe of a financial transaction card swiped through the slot during a financial transaction between a buyer and seller, the read head configured to read data stored on the magnetic stripe and to produce a signal indicative of the data stored on the magnetic stripe;
tamper protection circuitry configured to detect tampering of at least one of physical or electrical components of the card reader;
a rechargeable battery electrically coupled to the tamper protection circuitry and battery protection circuitry and a control line of an electronic switch, the rechargeable battery configured to provide power through the battery protection circuitry to at least one of the read head and the tamper protection circuitry through a first isolation diode until the battery protection circuitry detects that a voltage of the rechargeable battery has dropped to a predetermined threshold voltage, and upon such detection, activate a battery protection state which results in a non-linear drop off in power coming from the battery protection circuitry that in turn causes the electronic switch to change from a first state to a second state via the control line of the electronic switch, wherein the predetermined threshold voltage is greater than zero;
a non-rechargeable battery configured to provide backup power to at least the tamper protection circuitry through the electronic switch and a second isolation diode; and
the electronic switch configured to:
operate in the first state to electrically isolate the non-rechargeable battery from the read head and the tamper protection circuitry, wherein the rechargeable battery provides power to the read head and the tamper protection circuitry through the battery protection circuitry and the first isolation diode in the first state of the electronic switch, and
operate in the second state, wherein the non-rechargeable battery provides power to at least the tamper protection circuitry through the electronic switch and the second isolation diode in the second state of the electronic switch.

2. The card reader of claim 1, wherein the electronic switch is a field effect transistor (FET), and wherein the control line of the electronic switch is a gate line of the FET, wherein the non-rechargeable battery is electrically coupled to a source line of the FET, and wherein a drain line of the FET passes through the second isolation diode to at least the tamper protection circuitry.

3. The card reader of claim 1, wherein the electronic switch is a regulator, and wherein the control line of the electronic switch is an enable line of the regulator.

4. The card reader of claim 1, further comprising real-time clock circuitry and memory circuitry, wherein the rechargeable battery provides power to the real-time clock circuitry and the memory circuitry in the first state of the electronic switch, wherein the non-rechargeable battery is electrically isolated from the real-time clock circuitry and the memory circuitry in the first state of the electronic switch, and wherein the non-rechargeable battery provides power to the real-time clock circuitry and the memory circuitry in the second state of the electronic switch.

5. A card reader, comprising:
a read head within a slot of the card reader, the slot to receive a financial transaction card during a financial transaction between a plurality of entities, the read head configured to read data that is stored on the financial transaction card and generate a signal indicative of the data that is stored on the financial transaction card;
backup electronic circuitry other than the read head, the backup electronic circuitry configured to provide at least one backup operation;
a first battery that is electrically coupled to a control line of an electronic switch, the first battery configured to provide power to at least one of the read head or the backup electronic circuitry when the electronic switch is in a first state, wherein a drop in voltage at the control line of the electronic switch from the first battery causes the electronic switch to change from the first state to a second state;
a second battery configured to provide backup power to the backup electronic circuitry through the electronic switch when the electronic switch is in the second state; and
the electronic switch, wherein the electronic switch is configured to:
operate in the first state to electrically isolate the second battery from at least the backup electronic circuitry, wherein the first battery provides power to the read head and the backup electronic circuitry when the electronic switch is in the first state, and
operate in the second state, wherein, the second battery provides power to the backup electronic circuitry through the electronic switch when the electronic switch is in the second state.

6. The card reader of claim 5, wherein the first battery corresponds to a rechargeable battery and the second battery corresponds to a non-rechargeable battery, wherein the rechargeable battery corresponds to at least one of a lead-acid battery, a nickel cadmium battery (NiCd), a nickel metal hydride (NIMH) battery, a lithium ion (Li-ion) battery, or a lithium ion polymer (Li-ion polymer) battery, and wherein the non-rechargeable battery corresponds to at least one of an alkaline battery, an aluminum-ion battery, a dry cell battery, or a lithium battery.

7. The card reader of claim 5, wherein the electronic switch is a field effect transistor (FET), and wherein the control line of the electronic switch is a gate line of the FET.

8. The card reader of claim 5, wherein the backup electronic circuitry includes tamper protection circuitry and real-time clock circuitry and memory circuitry, and wherein the at least one backup operation includes the tamper protection circuitry detecting tampering of the card reader via opening of the card reader.

9. The card reader of claim 5, further including:
a battery protection circuitry that is electrically coupled to the first battery, the battery protection circuitry configured to:
measure a voltage of the first battery;
determine that the voltage of the first battery does not exceed a predetermined threshold voltage that is greater than zero; and
electrically isolate the first battery from the control line of the electronic switch to cause a non-linear drop in voltage to be received at the control line of the electronic switch, causing the electronic switch to change from the first state to a second state.

10. The card reader of claim 9, wherein the battery protection circuitry includes an adjustable resistor, a switching component configured to electrically isolate the first battery from at least the read head and the control line of the electronic switch, and control circuitry configured to determine the voltage of the first battery and to operate the switching component.

11. The card reader of claim 10, wherein the predetermined threshold voltage is adjusted based on adjustments to the adjustable resistor.

12. The card reader of claim 5, wherein the first battery provides power that does not pass through the electronic switch to at least one of the read head or the backup electronic circuitry.

13. The card reader of claim 5, further comprising:
a first isolation diode that is electrically coupled between the first battery and at least one of the read head or the backup electronic circuitry, wherein the first battery provides power to at least one of the read head or the backup electronic circuitry through the first isolation diode when the electronic switch is in the first state; and
a second isolation diode that is electrically coupled between the electronic switch and the backup electronic circuitry, wherein the second battery provides power to at least the backup electronic circuitry through the electronic switch and the second isolation diode when the electronic switch is in the second state.

14. The card reader of claim 13, wherein the first isolation diode and the second isolation diode electrically isolate the first battery and the second battery from each other.

15. The card reader of claim 13, wherein the first isolation diode and the second isolation diode include at least one of a light emitting diode, a photodiode, a schottky diode, a transient voltage suppression diode, a tunnel diode, a varicap diode, or a zener diode.

16. The card reader of claim 5, further including:
an output jack adapted to be coupled into a microphone input of a portable computing device, wherein output jack conveys to the portable computing device the signal indicative of the data that is stored on the financial transaction card.

17. A method, comprising:
activating a card reader, the card reader including a read head within a slot of the card reader, the slot to receive a financial transaction card during a financial transaction between a plurality of entities, the read head configured to read data that is stored on the financial transaction card and generate a signal indicative of the data that is stored on the financial transaction card;
determining that a voltage of a first battery exceeds a predetermined threshold voltage, wherein the predetermined threshold voltage is greater than zero;
operating an electronic switch in a first state, wherein operation of the electronic switch in the first state electrically isolates a second battery from at least the read head and backup electronic circuitry other than the read head;
providing power to the read head and the backup electronic circuitry from the first battery while operating the electronic switch in the first state;
determining that the voltage of the first battery no longer exceeds the predetermined threshold voltage;
causing a non-linear drop in power provided from the first battery in response to determining that the voltage of the first battery no longer exceeds the predetermined threshold voltage;
receiving the non-linear drop in power provided from the first battery at a control line of the electronic switch; and
operating the electronic switch in a second state in response to receipt of the non-linear drop in power provided from the first battery at the control line of the electronic switch, wherein operation of the electronic switch in the second state causes the second battery to provide backup power to the backup electronic circuitry through the electronic switch.

18. The method of claim 17, wherein the electronic switch is a field effect transistor (FET), and wherein the control line of the electronic switch is a gate line of the FET.

19. The method of claim 17, wherein the backup electronic circuitry includes tamper protection circuitry and real-time clock circuitry and memory circuitry, and wherein the tamper protection circuitry is configured to detect tampering of the card reader via opening of the card reader.

20. The method of claim 17, wherein the backup electronic circuitry includes tamper protection circuitry that is configured to detect tampering of the card reader via modification of at least one path of electrical current within the card reader.

* * * * *